UNITED STATES PATENT OFFICE.

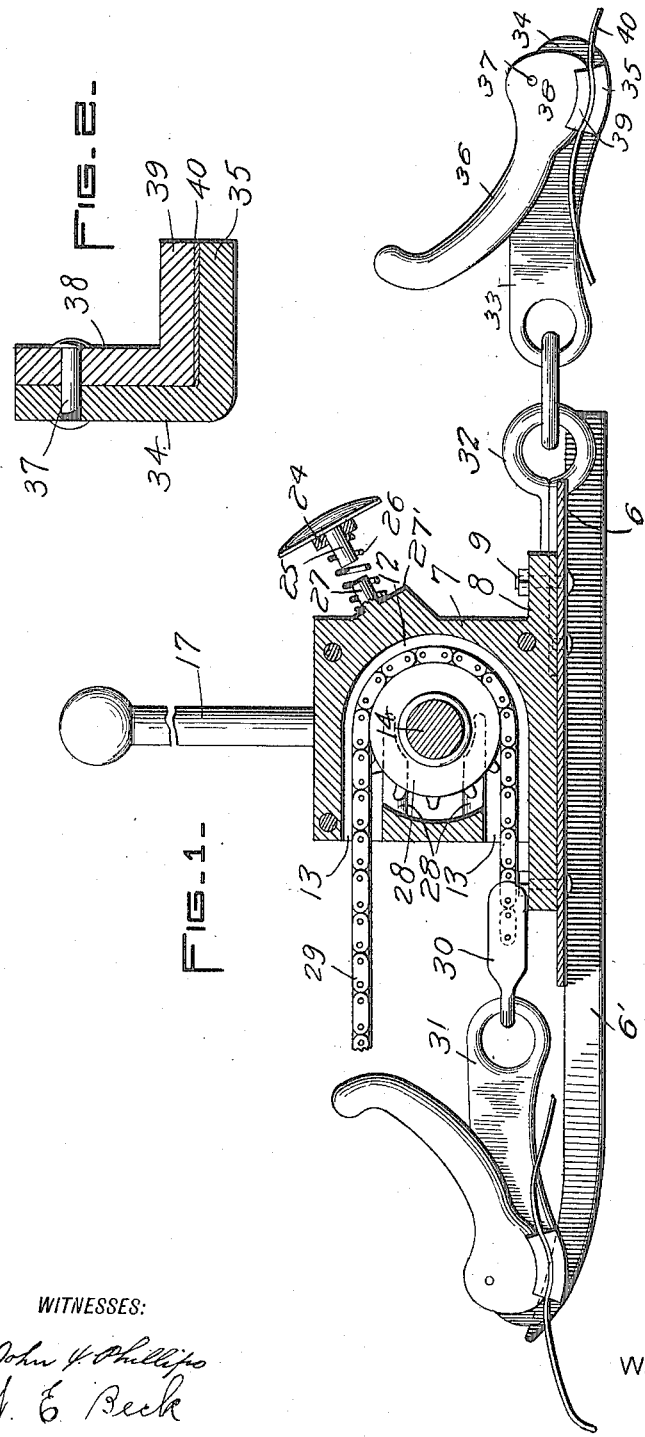

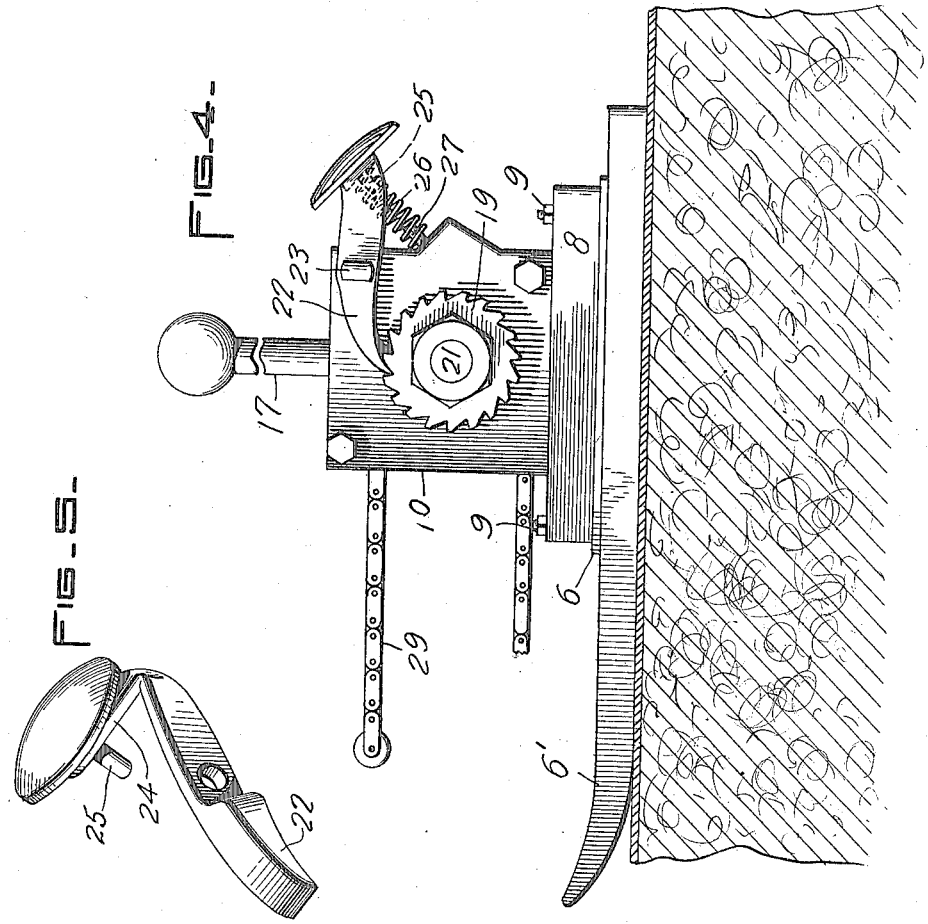
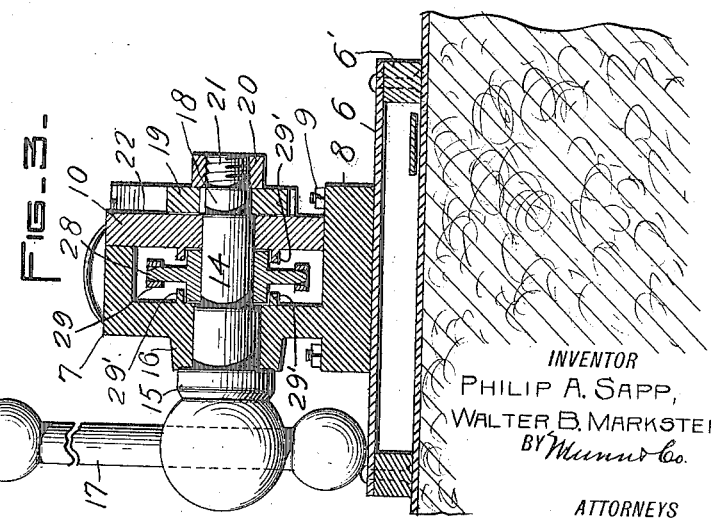

PHILIP ALLEN SAPP AND WALTER B. MARKSTEIN, OF EUFAULA, ALABAMA; SAID MARKSTEIN ASSIGNOR OF ONE-HALF OF THE WHOLE RIGHT TO A. J. MILLER, OF BARBOUR, ALABAMA.

BALE-BAND TIGHTENER.

1,196,591.  Specification of Letters Patent.  Patented Aug. 29, 1916.

Application filed May 15, 1915. Serial No. 28,399.

*To all whom it may concern:*

Be it known that we, PHILIP A. SAPP and WALTER B. MARKSTEIN, citizens of the United States, and residents of Eufaula, in the county of Barbour and State of Alabama, have invented an Improvement in Bale-Band Tighteners, of which the following is a specification.

The present invention relates to bale band tighteners and more particularly to a portable apparatus especially adapted for use in tightening bands around bales of cotton.

The primary object of the invention is to provide an apparatus embodying novel constructions and arrangements of parts for effectively drawing the bands tightly around the bale before coupling the ends of the band together.

Briefly stated, the invention comprises a housing having a rotatable drum or shaft mounted therein and around which passes a flexible connection, to one end of which is secured a band clamp. The housing also has a band clamp secured thereto and suitable operating means are provided for drawing said connection around said shaft whereby the ends of the band are brought together.

The inventive idea involved is capable of receiving a variety of mechanical expressions, one of which, for the purpose of illustrating the invention, is shown in the accompanying drawings, in which—

Figure 1 is a side elevation of the invention, the housing being shown in longitudinal section. Fig. 2 is a transverse section of one of the clamping members used in connection with the invention. Fig. 3 is a transverse section of the apparatus showing the same applied to a bale. Fig. 4 is a fragmentary side elevation of the device, and Fig. 5 is a detail perspective view of the locking pawl used in connection with the invention.

Referring more particularly to the accompanying drawings in which like reference characters indicate similar parts, the numeral 6 indicates a base plate preferably of rectangular formation having secured thereto the longitudinally extending runners 6'. A housing 7 is mounted on said plate and provided with the base flanges 8 whereby the same may be secured thereto by means of bolts 9. The housing 7 includes a detachable side plate 10 secured to the main portion of the housing and adapted to be removed should it become necessary to gain access to the interior thereof. The compartment 12 of the housing 7 has its inner end rounded, as shown in Fig. 1, and communicates with oppositely disposed openings 13 formed in the end of the housing opposite said rounded end, the compartment 12 and openings 13 thereby forming a substantially U-shaped cavity.

A shaft 14 is rotatably mounted in the housing transversely thereof and is provided on one end thereof with an enlarged portion 15 spaced from the adjacent side of the housing 7 by a projection 16 and provided with a sliding vise handle 17 for rotating said shaft. The opposite end of the shaft 14 is provided with a reduced portion 18 exteriorly of the detachable side plate 10 of the housing and has mounted thereon a small ratchet 19 for a purpose which will presently appear. The shaft 14 and other coöperating parts are held in position by means of a nut 20 threaded upon the reduced end 21 of said shaft. A locking pawl 22 abuts the side plate 10 and is pivoted to the housing adjacent the top thereof by means of a bolt 23 which extends transversely through said housing, side plate and locking pawl and further assists in retaining the side plate 10 in position. The locking pawl 22 is provided at one end thereof with a lateral extension 24 carrying a headed stud 25 upon which is mounted one end of a coiled spring 26, the other end of which engages a stud 27 extending at right angles to the shoulder 27' formed upon the adjacent end of the housing 7. This spring is adapted to retain the opposite end of the pawl 22 in engagement with the ratchet 19 whereby the shaft 14 is prevented from rotating in one direction.

The shaft 14 has mounted thereon, in the compartment 12 of the housing, a sprocket wheel 28 adapted to carry a chain 29, the ends of said chain extending through the openings 13. Guard flanges 29' are formed integrally with the sides of the housing and arranged on each side of said wheel adjacent the hub thereof. One end of the chain 29 is provided with a connection 30 to which is secured a band clamp 31. It will thus be seen that rotation of the handle 17 in one direction will draw the clamp 31 toward the housing 7. The opposite end of the housing has secured thereto, at the bottom thereof, an eye-bolt 32 to which is connected a band clamp 33 which is identical in construction to the clamp 31 and therefore a description of one will suffice for both.

Each band clamp comprises a body portion 34 having a lateral extension 35 at the bottom thereof. A handle 36 is pivoted at 37 to the body portion 35 and has its end 38 enlarged to form a cam provided with a lateral extension 39 which is adapted to cooperate with the extension 35 to securely retain the bale band 40 therebetween.

In practice, when it is desired to secure the band around the bale of cotton or the like, the apparatus is placed upon the upper side of the bale, as illustrated in Figs. 3 and 4. The ends of the bale 40 are then securely fastened to the clamps 31 and 33 whereupon the handle 17 is rotated counter-clockwise, as shown in Fig. 1, thus drawing the clamp 31 toward the housing and tightening the band around the bale, after which the ends of the band may be coupled together. During the tightening process the band 40 will extend between the base plate and the bale which is in spaced relation to said plate, so that after the ends have been buckled together and the apparatus removed, there will be no slack in the band.

From the foregoing description taken in connection with the accompanying drawings it will be seen that the invention provides a band tightener of comparatively simple construction, effective in carrying out the purpose for which it was designed and one which may be manufactured at a minimum cost.

We claim:—

1. An apparatus of the character described, comprising a base plate, a housing carried thereby, a rotatable shaft mounted in said housing, a ratchet carried by said shaft, a locking pawl pivoted to the side of said housing and adapted to engage said ratchet, said pawl being provided with a lateral angular extension projecting around the adjacent end of said housing, means for normally maintaining said pawl in engagement with the ratchet, and a flexible element supported by said shaft.

2. An apparatus of the character described, comprising a base plate, a housing carried thereby, a rotatable shaft mounted transversely in said housing, a ratchet carried by said shaft, a locking pawl pivoted to the side of said housing and adapted to engage said ratchet, said pawl being provided with a lateral angular extension projecting around the adjacent end of said housing, a spring having one end engaging said housing and the other end secured to said pawl whereby the latter is normally maintained in engagement with the ratchet, a sprocket wheel mounted on said shaft in said housing, a flexible drive element carried by said sprocket, a band clamp secured to one end of said element, and a similar clamp secured to the opposite end of said housing.

3. An apparatus of the character described, comprising a plurality of runners, a base plate carried thereby, a housing mounted on said plate and comprising a detachable side plate, a rotatable shaft mounted transversely of said housing, band tightening means carried by said shaft, a band clamp connected to said means, and a similar clamp connected to the opposite end of said housing.

4. An apparatus of the character described, comprising a plurality of runners, a base member carried thereby, a housing mounted on said base member and comprising a detachable side plate, a rotatable shaft mounted in said housing, and band tightening means carried by said shaft.

PHILIP ALLEN SAPP.
WALTER B. MARKSTEIN.